United States Patent [19]

Prentice

[11] Patent Number: 4,702,332
[45] Date of Patent: Oct. 27, 1987

[54] ATTACHMENT OF SKIRT PANTS FOR SURFACE-EFFECT VEHICLES

[75] Inventor: Mark E. Prentice, Chippenham, England

[73] Assignee: Avon Industrial Polymers Limited, Wiltshire, England

[21] Appl. No.: 796,544

[22] Filed: Nov. 8, 1985

[30] Foreign Application Priority Data

Nov. 9, 1984 [GB] United Kingdom ............... 8428391

[51] Int. Cl.⁴ .............................................. B60V 1/04
[52] U.S. Cl. .................................... 180/127; 180/128
[58] Field of Search ..................... 180/127, 126, 128;
114/67 A; 160/392, 393; 280/154.5 R, 154.5 A, 153.5

[56] References Cited

FOREIGN PATENT DOCUMENTS 1335213 7/1963 France .
1492927 7/1967 France .
2077448 10/1971 France .
2132564 11/1972 France .
1104657 2/1968 United Kingdom .
1302716 1/1973 United Kingdom .
1580794 12/1980 United Kingdom .

Primary Examiner—John J. Love
Assistant Examiner—Donn McGiehan
Attorney, Agent, or Firm—Merchant, Gould, Smith, Edell, Welter & Schmidt

[57] ABSTRACT

To make a skirt part of a surface-effect vehicle readily and reliably retainable to the vehicle while able to be folded to be sent to the position of use, the skirt part has an enlarged bead to be slid into a restricted-mouth channel on the vehicle, the core of the bead being an elongate spiral spring of stainless steel. End-plugs are fitted to prevent endwards escape from the channel.

11 Claims, 4 Drawing Figures

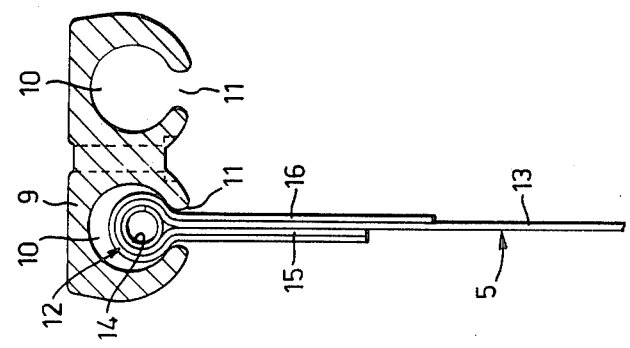
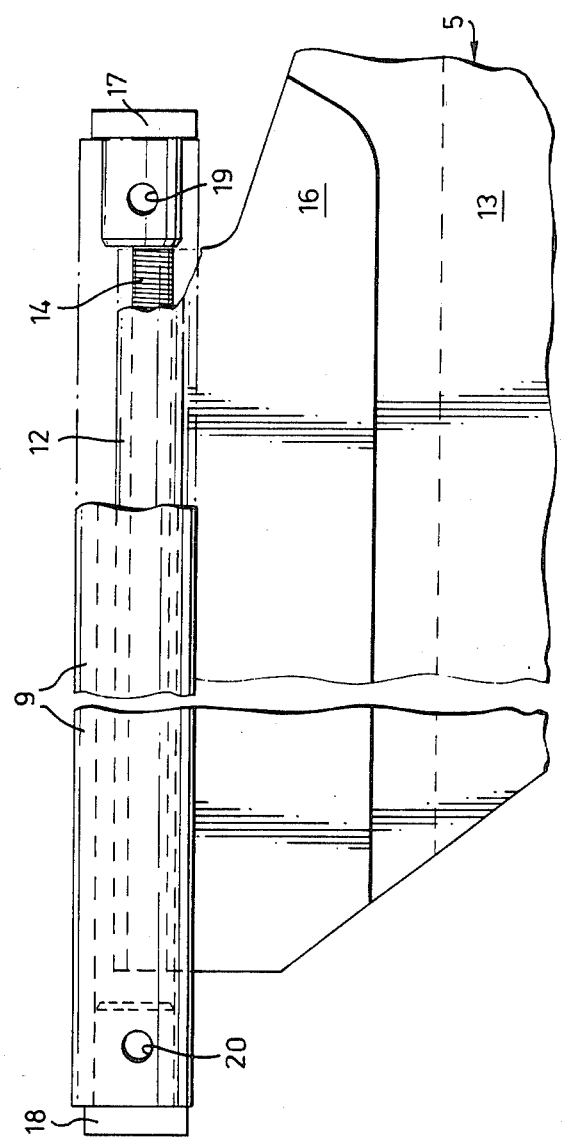

ATTACHMENT OF SKIRT PANTS FOR SURFACE-EFFECT VEHICLES

This invention relates to the attachment of skirt components for surface-effect or air cushion vehicles, also known (at least in the United Kingdom) as hovercraft, especially for non-amphibious or sidewall hovercraft or surface-effect ships.

The air-cushion of a surface-effect vehicle is contained and guided by skirts made from rubber coated fabrics which hang from the structure of the vehicle towards the surface over which it is to travel. The function of the skirts is to allow the vehicle to traverse unevenness in the ground or water over which it is travelling. Because the skirts are subjected to continual flexion their wear and attachment are continuing problems even though major strides have been made to overcome them in recent years.

The present invention relates to the attachment of parts of the skirt, especially those which are known as fingers, when these are attached directly to the structure. These may be fitted at the bow or stern of the craft and can be of great size. The most satisfactory form of attachment has been along continuous lines. However since the parts have to be periodically removed for replacement or repair, often without lifting the craft from the water, their easy removal and installation is essential. It is a problem therefore to achieve secure, continuous but readily detachable fastening of these skirt parts.

In the past they have been formed with a solid bead on the top edge of the finger which is fitted into a channel secured to the underside of the rigid structure of the vehicle. The core of that bead has been a hard plastics material such as nylon or polyacetal resin, rubber or rope. Beads made of these materials cannot be relied on to prevent movement of the finger along the direction of the channel without additional securing means such as metal plates which are bolted to the rubber and to the structure of the vehicle. These fastenings, beneath the craft complicate the maintenance considerably.

The present invention envisages forming an enlarged bead of a skirt part, such as a finger, of a surface-effect vehicle with a bead core which is a metal spring element, preferably a stainless steel close-wound hollow spiral spring. The securing is completed by a plug at the outboard end which may fit more or less exactly the channel which is receiving the bead and which may be penetrated by an aperture registerable with an aperture in the channel so that longitudinal restraint of the plug and hence of the finger in the channel may be provided by passing, for example, a bolt or pin through those apertures. This restraint may be provided at both ends of the channel to simplify installation. It has been found that the outboard pressure forces acting along the bead and channel can be resisted entirely by the outboard plugs and their pins, because it is comparatively easy to bond rubber or the other elastomers used for hovercraft fingers to metal spring elements using proprietory primers.

A subsidiary problem that has arisen with existing skirt parts, especially those of considerable size such as bow fingers, arises from the rigidity of some of the materials used as the core of the bead. This prevented these bow fingers being folded or rolled for despatch to their point of use. Since some finger beads may reach as much as six meters in length this is a substantial problem. When a metal core is used as proposed in the invention the part may readily be folded so that much more economical packaging and means of despatch may be used.

A particular embodiment of the invention will now be described by reference to the accompanying drawings wherein:

FIG. 3 is a side elevation of the bead portion of a finger; and

FIG. 4 is a section through the finger showing it mounted in a channel.

Figure 1:
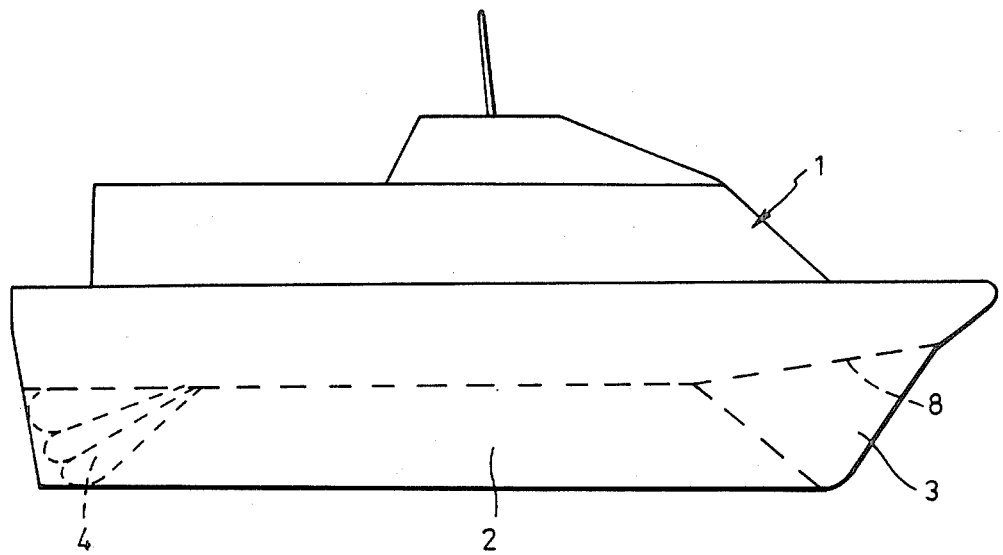
FIG. 1 shows highly diagrammatically an air cushion vehicle with sidewalls and the general position of various skirt parts in such a craft.

In FIG. 1 a surface-effect vehicle 1 has twin-hulls 2, bow skirt 3 and stern skirt 4. The bow skirt consists of a number of fingers of flat shape 5 where edges 6 and 7 are attached to the structure. Edges 6 extend straight and generally fore and aft, being attached to the underside of the rigid structure of the vehicle, along line 8.

Figure 2:
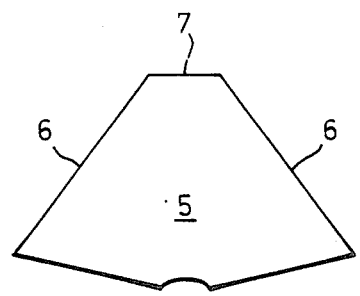
FIG. 2 is a flat view of a bow finger.

The means for securing skirt parts such as these fingers to the rigid structure of the vehicle according to the invention is seen in FIGS. 2 and 3. Double channel sections 9, FIG. 3, are secured to the underside of the rigid structure. They suitably are aluminium alloy extrusions. Parallel channels 10 with restricted mouths 11 are for receiving the enlarged bead portions 12 of respective bow fingers. The restricted mouth 11 of each channel 10 prevents the escape of the bead downwardly. The bead is formed by passing an edge portion of the fabric-reinforced elastomer material 13 of a finger around a metal resilient core 14, the core having previously been coated with a conventional metal-to-rubber bonding agent. The material 13 is brought round at 15 and, together with a reinforcing layer 16 bonded together conventionally to entrap the core 14.

A particularly preferred form for a hollow metal core 14 of resilient character is that of a close wound stainless steel spiral spring the wire of which is of square cross section. At each end of this core 14 there will be positioned an end plug 17,18 suitably also of stainless steel. Plugs 17,18 have apertures 19 which are registerable with apertures 20 in the channel section 9. The finger is fitted by passing the enlarged bead 8 longitudinally along the channel until it abuts against the previously-fitted end plug at one end, usually the inboard end plug 18. Once it is positioned the other end plug 17 is fitted and likewise secured by pins, bolts or other securing means through the registering apertures 19,20. Since the material 13 of the finger is bonded to the metallic core element this entrapment by end plugs, coupled with the restraint on lateral movement afforded by the channel section, is all that is needed for a completely secure but readily releasable fastening of the finger in the channel.

Because of the nature of the core, the fingers may be folded or rolled for despatch from the factory to the place where they are to be fitted.

Though the embodiment has been described with reference to the skirt parts of a surface-effect nonamphibious ship with rigid twin hulls, the invention is applicable to securing skirt parts of amphibious, air-cushion vehicles.

What is claimed is:

1. A skirt element for a surface-effect vehicle, the element comprising flexible sheet material and a bead at at least one edge thereof adapted for attachment to a body of the vehicle, the bead extending all along said edge and comprising a portion of the sheet material turned around and bonded to a coextensive continuous flexible bead core which is an elongate metal spiral spring element.

2. A skirt element as claimed in claim 1 wherein the spring element is a hollow spiral spring.

3. A skirt element as claimed in claim 2 wherein the hollow spiral spring consists of stainless steel.

4. A surface-effect vehicle comprising a flexible skirt element, means for attaching the skirt element comprising an elongate channel on a body of the surface-effect vehicle, the channel having a restricted mouth portion, the skirt element having an enlarged bead at at least one edge thereof, the enlarged bead having a transverse dimension greater than that of the restricted mouth of the channel whereby the bead is entrapped against escape from the channel through the mouth, the bead comprising a flexible bead core surrounded by and bonded to material of the skirt element, the bead core being an elongate metal spiral spring element coextensive with the bead.

5. A surface-effect vehicle according to claim 4 wherein the elongate spring element is a stainless steel hollow spiral spring.

6. A surface-effect vehicle as claimed in claim 4 further comprising at each end of the channel enclosing said bead an end plug for the channel, and means for releasably retaining said end plugs to the channel.

7. A surface-effect vehicle as claimed in claim 6 wherein said retaining means comprises a stem passed through apertures in two side walls of the channel and in the end plug.

8. A surface-effect vehicle as claimed in claim 4 which comprises twin rigid waterborne hulls, the skirt elements being at least one of bow and stern skirt elements positioned between said rigid hulls.

9. A method of securing a flexible skirt element to the body of a surface-effect vehicle which comprises forming an enlarged bead along an edge of the skirt element by securing a portion of sheet material of the element around an elongate hollow spiralmetal spring, feeding the enlarged bead lengthwise into a mounting channel on the body whereby to entrap the bead by a restricted mouth of the channel, and preventing escape lengthwise of the bead by fitting at least one end plug to the channel, and securing said at least one end plug in position.

10. An element according to claim 1 wherein said core is bonded to an elastomeric material and wherein said material is turned around said core.

11. An element according to claim 4 wherein said material is an elastomeric material and wherein said material is turned around said core.

* * * * *

UNITED STATES PATENT AND TRADEMARK OFFICE
CERTIFICATE OF CORRECTION

PATENT NO. : 4,702,332
DATED : 27 October 1987
INVENTOR(S) : Mark E. Prentice

It is certified that error appears in the above-identified patent and that said Letters Patent is hereby corrected as shown below:

Title should read --ATTACHMENT OF SKIRT PARTS FOR SURFACE-EFFECT VEHICLES

In column 4, cancel lines 21-23 (claim 10)

Signed and Sealed this

Seventeenth Day of May, 1988

Attest:

DONALD J. QUIGG

Attesting Officer

Commissioner of Patents and Trademarks